United States Patent [19]

Borrman et al.

[11] Patent Number: 5,120,488
[45] Date of Patent: Jun. 9, 1992

[54] SEALING SLEEVE OF MEMORY METAL

[75] Inventors: Bo Borrman; Olie Eriksson; Hans Kornfeldt; Lars-Ake Körnvik; Lars Törnblom, all of Västerås, Sweden

[73] Assignee: ABB Atom AB, Västeras, Sweden

[21] Appl. No.: 647,251

[22] Filed: Jan. 29, 1991

[30] Foreign Application Priority Data

Jan. 31, 1990 [SE] Sweden .................. 9000328

[51] Int. Cl.$^5$ ............................ G21C 13/028
[52] U.S. Cl. .............................. 376/203; 376/286
[58] Field of Search ............... 376/203, 204, 286; 285/381; 138/98; 13/99

[56] References Cited

U.S. PATENT DOCUMENTS

| | | | |
|---|---|---|---|
| 2,282,354 | 5/1942 | Gunn | 376/286 |
| 3,318,336 | 5/1967 | Treiber | 376/286 |
| 4,872,713 | 10/1989 | Kapgan | 285/381 |
| 5,006,300 | 4/1991 | Jönsson et al. | 376/203 |

Primary Examiner—Brooks H. Hunt
Assistant Examiner—Frederick H. Voss
Attorney, Agent, or Firm—Watson, Cole, Grindle & Watson

[57] ABSTRACT

The invention relates to a sealing sleeve for sealing a leak in, for example, a pipe, a pipe socket or the like in a nuclear reactor. The sleeve comprises a bellows-like mid-portion (1) with annular ends, at least these or part of these (2) being made of a memory metal with a suitable transition temperature. At a temperature above the transition temperature, that part of these annular ends which consists of memory metal has been given an inner diameter suitable for achieving sealing around the relevant pipe section on each side of the leak. The mentioned part of the ends has thereafter, at a temperature below the transition temperature, been deformed into a diameter which permits the sleeve to be freely fitted onto the pipe. In fitted position, the sleeve is then heated to above the transition temperature, the memory metal then striving to recover its previous shape and shrinks the sleeve so as to obtain sealing.

8 Claims, 3 Drawing Sheets

SEALING SLEEVE OF MEMORY METAL

FIELD OF THE INVENTION

The present invention relates to a sealing sleeve of memory metal, especially suited to repair such leaks in pipes or the like which are difficult to reach, where the sealing sleeve must also be able to endure great temperature differences without being influenced such that the sealing effect is discontinued. The sealing sleeve is particularly suited for use in a nuclear reactor environment.

BACKGROUND OF THE INVENTION

In a nuclear reactor there are numerous pipes, pipe sockets and the like, in which cracks, especially in the vicinity of welds, may arise and where, during repair work, one end of the pipe may be released so as to form an open end for the fitting of a sealing sleeve. A plurality of various types of sealing sleeves are known—also such of memory metal (see, e.g., U.S. Pat. Nos. 4,773,680 and 4,149,911).

Characteristic of these sleeves is that they are not suited for sealing of pipe joints, for example control rod drive (CRD) stub tubes in a nuclear reactor, in which the pipes on either side of the joint are eccentrically arranged. Nor are they adapted to withstand the dimensional changes, caused by the temperature, which occur in a nuclear reactor in which the temperature varies from about $+40°$ C. to about $+280°$ C.

SUMMARY OF THE INVENTION

The present invention relates to a sealing sleeve for, for example, a pipe socket of such a design that the above-mentioned drawbacks are eliminated. The sealing sleeve according to the invention is characterized in that it comprises a bellows-like mid-portion with annular ends, at least these ends or part of these ends being made of a memory metal with a suitable transition temperature and being given an internal diameter suitable for achieving sealing around the relevant pipe section on each side or the leak. That part of the ends which consists of memory metal is intended to thereafter, at a temperature below the transition temperature, be deformed into a diameter which permits the sleeve to be freely fitted-onto the pipe. In fitted position, the sleeve is intended to be subjected to heating to a temperature above the transition temperature in order to achieve the desired sealing when the memory metal in the sleeve strives to recover its original shape.

According to one embodiment, the entire sleeve, including the bellows, is made of memory metal, the annular ends around the inner side being provided with an elevation or a number or grooves for obtaining more reliable sealing.

In order to improve the sealing further around, for example, pipe sockets, the elevation or the grooves are replaced by sealing rings of stainless steel, the outer limiting surface of which is spherical and has an external diameter which fits inside the sleeve in its deformed state below the transition temperature. The rings have an inner diameter which permits them to be fitted freely onto the pipe socket. The outer spherical limiting surface of the rings facilitates the adoption by the device of any eccentricity between the pipe sections over which the sealing sleeve is fitted by permitting the sleeve-to slide over the spherical contact surfaces on the outside of the sealing rings. The sleeve finally reaches an oblique position which coincides with the connecting line between the spherical centers of the sealing rings.

The aim is to produce a sealing sleeve of memory metal which may be stocked in its deformed state and which withstands all eccentricities up to a certain maximum value without any further enlarging deformation of the diameter of the sleeve being necessary.

BRIEF DESCRIPTION OF THE DRAWINGS

The invention will be most readily understood with reference to the accompanying FIGS. 1-6, wherein.

DETAILED DESCRIPTION OF THE PREFERRED EMBODIMENTS

Figure 1:
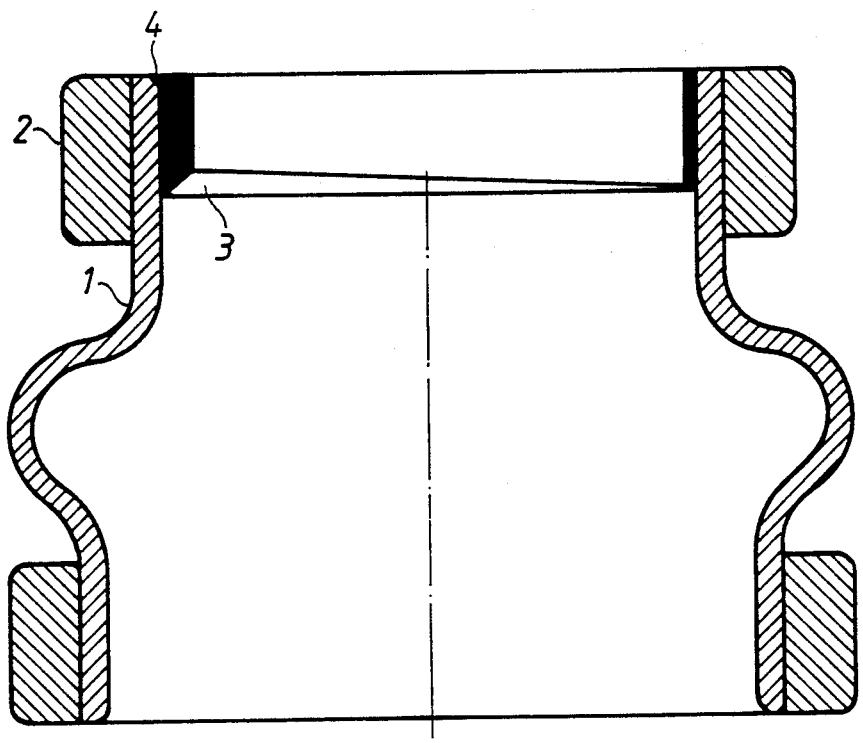
FIG. 1 shows an embodiment of a sealing sleeve according to the invention.
Figure 2:
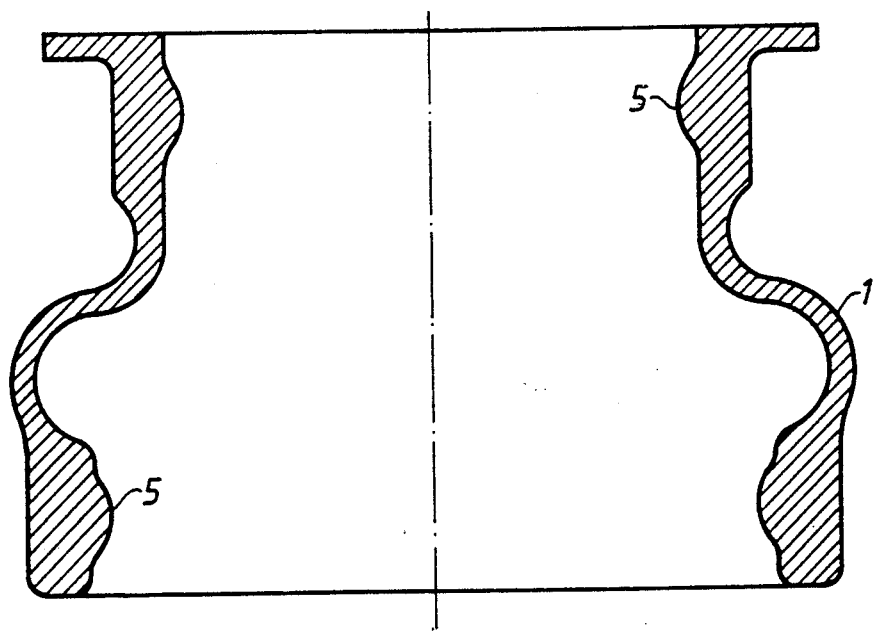
FIG. 2 shows another embodiment of a sealing sleeve according to the invention.
Figure 3:
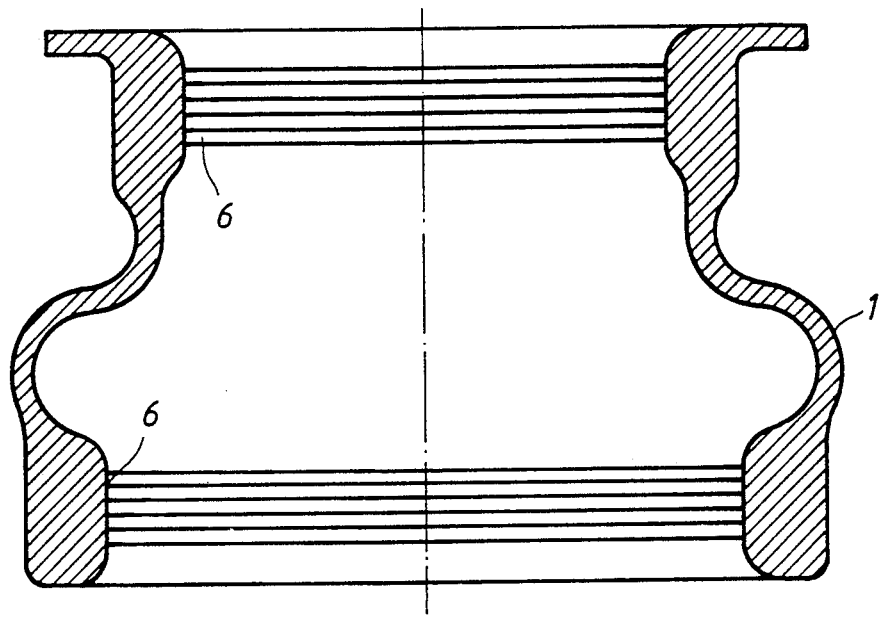
FIG. 3 shows another embodiment of a sealing sleeve according to the invention.

FIG. 1 shows a cross section of a sealing sleeve. In FIG. 1, 1 designates a bellows of stainless steel surrounded at its ends by rings of memory metal 2. A memory metal is an alloy which may occur in a stable austenitic state at a temperature above a certain so-called transition temperature and a stable martensitic state below this temperature. A memory metal, which in the austenitic state has been given certain first shape and is then cooled down below the transition temperature to martensitic state and is thereafter deformed to a second shape, has the ability, after heating above the transition temperature to the austenitic state, to recover its first shape, i.e. to remember this shape. Certain memory metals have the ability to change shape from the first shape to the second shape and inversely—thus each time the transition temperature is passed. They have a so-called two-way memory effect. In the case discussed here, however, it is desirable that the memory metal is of so-called one-way type.

The above means that that part of a sealing sleeve which is of memory metal is given the desired first shape in the austenitic state. Thereafter, it is cooled to the martensitic state and is deformed into a second shape suited for mounting. After heating above the transition temperature to austenitic state, it assumes or attempts to assume the first shape and then remains in this shape even if the temperature should again drop to below the transition temperature. This is a condition for the sealing to be considered permanent.

There are a number of alloys which have a one-way memory effect and which may be used in the environment provided by a nuclear reactor. Among these may be mentioned the Ni-Ti based NITINOL and an iron-based alloy Fe-Cr-Ni-Mn-Si. These alloys have a transition temperature down towards about $+100°$ C., but probably even lower transition temperatures may be reached.

In FIG. 1, the bellows 1 is made with an inner diameter which provides a suitable mounting clearance with respect to the plastic deformation endured by the material therein. In view of the fact that stainless steel is used in this case, the deformation must probably be limited, involving a mounting clearance of a few millimeters for a diameter of about 100 mm. The rings 2 of memory metal are then formed in austenitic state with an inner diameter which is sufficiently much smaller than the outer diameter of the bellows 1, corresponding to the above-mentioned inner diameter, to ensure sealing. Then, the rings 2 are cooled down to below the transition temperature and are pressed out by means of a suitable tool so that the rings 2 fit snugly to the outer diameter of the bellows 1, as is clear from FIG. 1.

The bellows 1 and the rings 2 are thus connected together during storage, transport and mounting. The mounting over a crack or leak is normally performed at room temperature, for example in a nuclear reactor in shutdown state, whereupon the sleeve is heated above the transition temperature by some form of local heating, the rings 2 then tending to recover their austenitic shape. In so doing, the rings exert such a pressure on that part of the bellows 1 which is positioned inside the rings that the material in that part of the bellows 1 is plasticized and sealingly pressed against the pipe or the pipe socket. The force by which the rings of memory metal press the bellows against the pipe or pipe socket may become very great and depends, inter alia, on what diameter the rings 2 have been given in austenitic state in relation to the diameter of that pipe around which the rings are to seal together with the bellows 1.

If the eccentricity is great between, for example, a pipe socket and the pipe located therein, it may be suitable to provide one end of the sleeve with a sealing ring 3 of eccentric shape. The inner diameter of the sealing ring is chosen such that, from the beginning, it is somewhat larger, for example 1 mm, than the outer diameter of the tube around which it is to seal. The bellows 1 with the surrounding ring 2 is adapted to the outer diameter of the sealing ring 3 in martensitic state, i.e. below the transition temperature. The sealing ring 3 must then be suitably fixed to the bellows 1, for example by means of a weld 4. In use, the whole sleeve is passed over the pipe socket which is to be repaired and is heated locally to above the transition temperature, the rings 2 pressing the underlying parts of the bellows 1 and the sealing sleeve 3 against the pipe socket with such force that the material in these parts is plasticized and sealing is obtained around the pipe socket.

Figure 4:
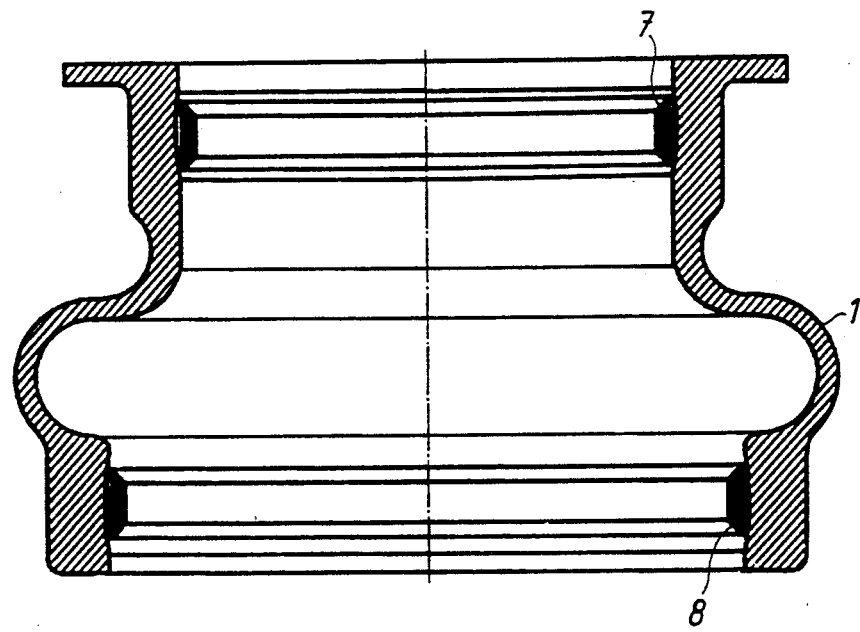
FIG. 4 shows another embodiment of a sealing sleeve according to the invention.
Figure 5:
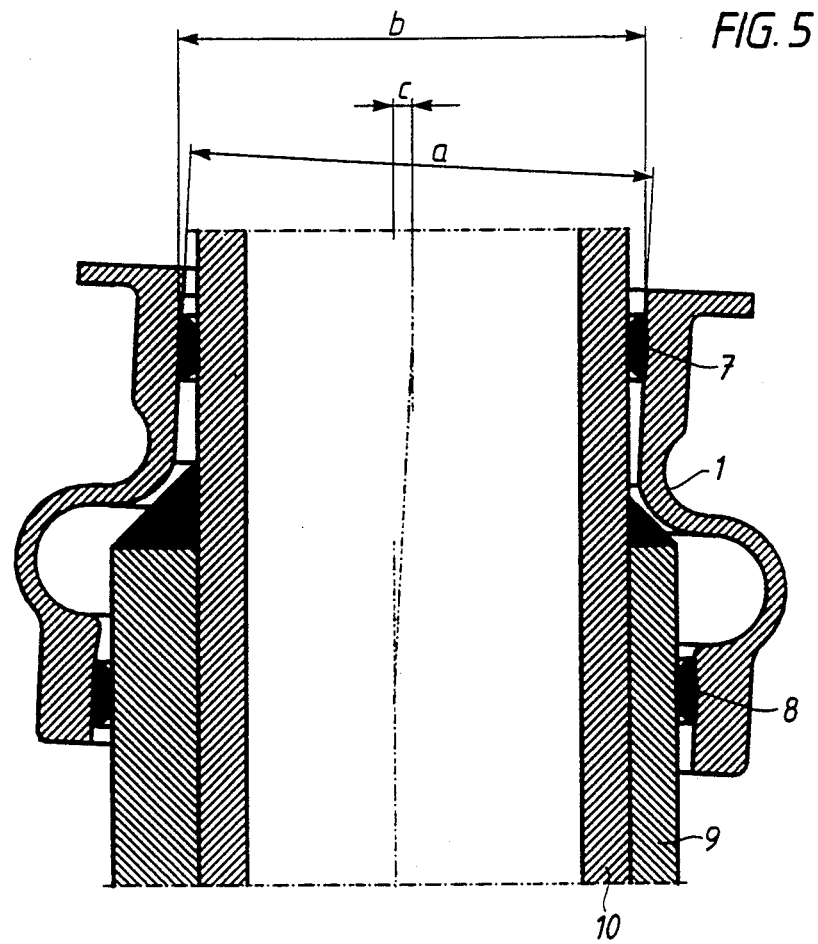
FIG. 5 shows a sleeve according to FIG. 4, shrunk onto a pipe socket, and a pipe eccentrically welded to the pipe socket.
Figure 6:
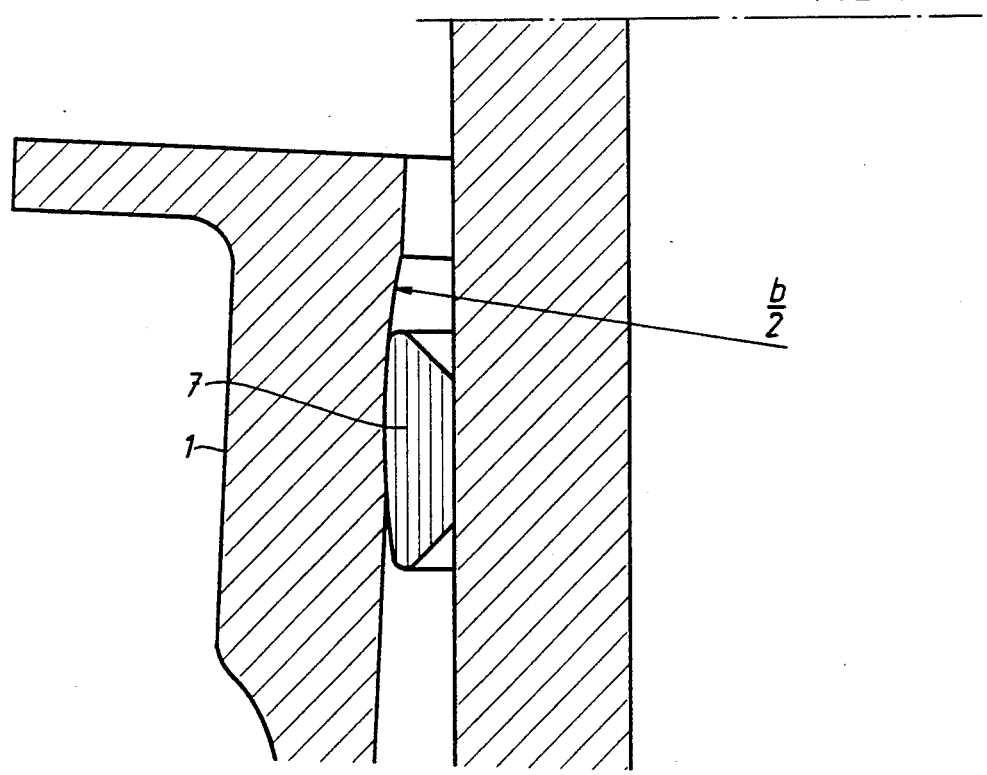
FIG. 6 shows an enlargement of the upper lefthand corner of FIG. 5.

It is, of course, possible to provide the sleeve according to FIG. 1 with other types of sealing rings, for example of the type shown in FIGS. 4, 5 and 6, in which the sealing rings have an outer spherical limiting surface and are arranged in spherical seats in the bellows 1, whereby great eccentricity of the pipe sections on each side of a leak or crack may be allowed without the function of the sealing sleeve being deteriorated.

However, the embodiment proposed above has certain limitations, which is due to stainless steel enduring a very limited deformation. Therefore, this type of sealing sleeve with a sufficiently large play to fit over a large number of pipe sockets with greatly varying ovality or eccentricity cannot be kept in stock.

To achieve the above, it is suitable to manufacture the entire sealing sleeve from memory metal, as shown in FIGS. 2–6. The memory metal in question endures a deformation up to about 8%, i.e. if the diameter of the sleeve is 100–130 mm, its diameter may be pressed out almost 10 mm in martensitic state and still recover its previous shape in austenitic state. Normally, this means that, for a pipe socket diameter of 100 mm, the sleeve is given a diameter in austenitic state which is perhaps 0.5 mm smaller and in martensitic state presses out the diameter to a total width of 102 mm or more. The dimensions in austenitic state are completely dependent on that sealing pressure around the pipe socket which the sealing sleeve should desirably exert. The dimensions in martensitic state depend on the play required between the sealing sleeve and the pipe or pipe socket in order to be able, without major problems, to fit the sealing sleeve in place taken into consideration the fact that the pipes around the pipe joint may be both oblique and eccentric.

When the sealing sleeve is made completely in memory metal, the annular ends of the sleeve may be provided, around the inner side, with a bulge 5 or with grooves 6. Also this type of sealing sleeve may be provided with sealing rings 7 and 8. The outer limiting surface of the sealing rings 7 and 8 is spherical and internally cylindrical. They are given an inner diameter which is somewhat larger than the tubular diameter against which they are to seal. At the annular ends the bellows 1 is given a suitable diameter, for achieving a suitable sealing pressure, in the austenitic state. Thereafter, it is cooled below the transient temperature and is deformed into an inner diameter which fits the outer diameter of the sealing rings 7, 8.

Further, in FIG. 5 a designates the diameter of the sleeve at its upper end and b the diameter of the spherical seat which is arranged for the sealing ring 7 in the sleeve. In this case, a may be equal to, say, 145 mm and b equal to 147 mm, that is, the spherical seat in the sleeve has a depth of 1 mm. The device is more clearly shown in the enlarged part in FIG. 6. The pipe socket 9 and the tube 10 are eccentrically arranged, and c is a measure of this eccentricity.

The intention is that the sleeve, as shown in FIG. 5, since the sealing rings 7 and 8 have a spherical outer surface in case of eccentricity between the pipe socket 9 and the enclosed pipe 10, shall be able to adopt an oblique position over the joint between these during the mounting that takes place below the transient temperature of the memory metal. Then when the sleeve is heated to above the transient temperature and the memory metal in the bellows 1 recovers its austenitic state, the rings are pressed by the bellows 1 with such force against the pipe socket 9 and the pipe 10 that the material therein is plasticized and the sealing rings 7, 8 are squeezed around the pipe socket 9 and the pipe 10, as shown in FIG. 5. This results in good sealing of that region of the pipe socket 9 and the pipe 10 which is located inside the sealing rings 7, 8.

By its bellows-like design, a sealing sleeve according to the invention has very great tolerance against the dimensional changes which, because of great temperature variations, may occur in a nuclear reactor which operates at a temperature of about +280° C. and during shutdown is cooled down to a temperature of about +40° C.

We claim:

1. A sealing sleeve for sealing a leak in a pipe or pipe socket in a nuclear reactor, which pipe or pipe socket in repair position has an open end for receiving said sealing sleeve which is intended to sealingly surround said pipe or pipe socket on each side of said leak, wherein the sleeve comprises a mid-portion defining a bellows and annular ends, said bellows being made of memory metal having an original shape and a suitable transient temperature, wherein at a temperature above the transient temperature said annular ends define a first diameter which is suitable for achieving sealing around the pipe or pipe socket on each side of the leak, and wherein at a temperature below the transient temperature, the ends define a second diameter permitting the sleeve to be freely fitted onto the pipe or pipe socket, said sleeve in a fitted position being intended to be subjected to heating to a temperature above the transient temperature in order to achieve the desired sealing by the memory metal striving to recover its original shape, said sleeve being able to withstand dimensional changes in the pipe or pipe socket due to temperature variations in the nuclear reactor between +40° C. and +280° C.

2. A sealing sleeve according to claim 1, wherein said annular ends around the inside of the sleeve are provided with a bulge or a plurality of grooves.

3. A sealing sleeve according to claim 1, wherein the interior of the sleeve at each end is provided with sealing rings of stainless steel, the outer limiting surface of each of which is spherical and has an outer diameter which sealingly fits within the inner diameter of the sleeve at a temperature below the transient temperature, and said rings of stainless steel having an inner diameter permitting the sleeve to be freely fitted over the pipe or the pipe socket.

4. A sealing sleeve according to claim 1, wherein the sleeve is internally provided with an eccentric sealing ring, at one end.

5. A sealing sleeve according to claim 1, wherein said annular ends are a first end having a first end diameter, and a second end having a second end diameter which is smaller than the first end diameter, said sleeve being able to seal a connection between two pipes having two different diameters.

6. A sealing sleeve for sealing a leak in a pipe or pipe socket in a nuclear reactor, which pipe or pipe socket in repair position has an open end for receiving said sealing sleeve which is intended to sealingly surround said pipe or pipe socket on each side of said leak, wherein the sleeve comprises a mid-portion defining a bellows and annular ends, said bellows being made of stainless steel and provided at the ends with fitted-on rings of a memory metal having an original shape and a suitable transient temperature, said annular ends of the sleeve having a first diameter and said rings having a first inner diameter with a suitable mounting clearance in relation to the pipe or pipe socket to be sealed which pipe or pipe socket has a first outer diameter, said rings being given a second inner diameter at a temperature above the transient temperature of the memory metal which is chosen to be sufficiently smaller than said first outer diameter of the pipe or pipe socket such that in an applied position of the sleeve around said pipe or pipe socket sealing is achieved, said rings thereafter at a temperature below the transient temperature being extended into a third diameter suitable for pressing the rings onto said ends, said sleeve being able to withstand dimensional changes in the pipe or pipe socket due to temperature variations in the nuclear reactor between +40° C. and +280° C.

7. A sealing sleeve according to claim 6, wherein the sleeve at one opening is internally provided with an eccentric sealing ring of stainless steel having a diameter which enables the stainless steel ring to fit within the first inner diameter of the sleeve.

8. A sealing sleeve according to claim 6, wherein said annular ends are a first end having a first end diameter, and a second end having a second end diameter which is smaller than the first end diameter, said sleeve used for sealing a connection between two pipes having two different diameters.

* * * * *